United States Patent [19]

Schwimmer

[11] Patent Number: 5,878,930
[45] Date of Patent: Mar. 9, 1999

[54] BICYCLE SEAT PACK

[76] Inventor: Charles Martin Schwimmer, 1820 Gunston Way, San Jose, Calif. 95124

[21] Appl. No.: 714,453

[22] Filed: Sep. 16, 1996

[51] Int. Cl.⁶ ........................................................ B62J 9/00
[52] U.S. Cl. ........................... 224/427; 224/275; 224/439; 224/448; 248/551; 248/221.11; 24/613
[58] Field of Search ..................... 224/275, 427, 224/437, 439, 448; 24/612, 613; 297/188.12, 188.2; 248/551, 222.11, 221.11, 231.41, 230.3

[56] References Cited

U.S. PATENT DOCUMENTS

| | | | |
|---|---|---|---|
| 4,566,617 | 1/1986 | Jackson | 224/427 |
| 5,190,345 | 3/1993 | Lin | 224/427 |
| 5,460,303 | 10/1995 | Downs | 224/427 |
| 5,474,270 | 12/1995 | Rixen et al. | 224/427 |
| 5,573,163 | 11/1996 | Lee et al. | 2224/427 |

*Primary Examiner*—Linda J. Sholl
*Attorney, Agent, or Firm*—Kajane McManus

[57] ABSTRACT

The bicycle seat pack comprises a clam shell structure wherein a top portion includes a releasably locking bicycle seat engaging assembly including a release lever. A zipper extending almost completely around a periphery of the pack allows for a drop down bottom portion to drop away from the top portion, allowing for easy access to the interior space, with enhanced accessibility allowing for compartmentalization of the inner space, if desired.

4 Claims, 1 Drawing Sheet

FIG. 1
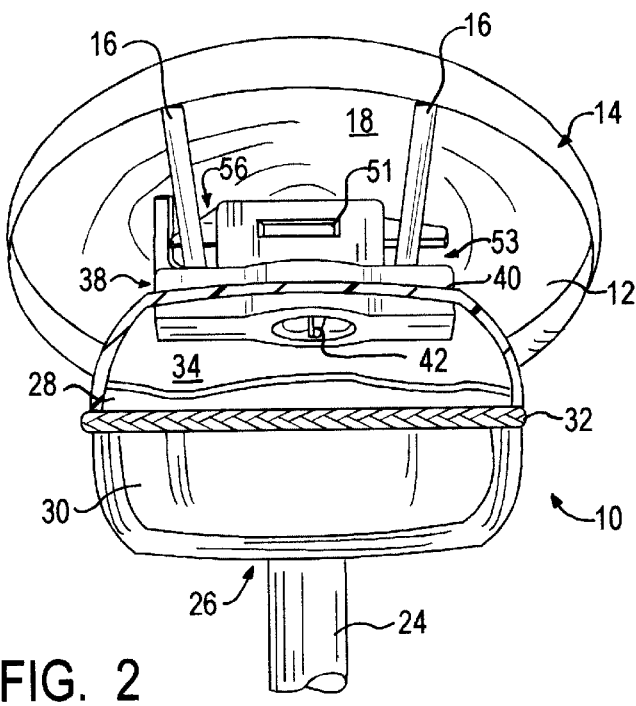
FIG. 2
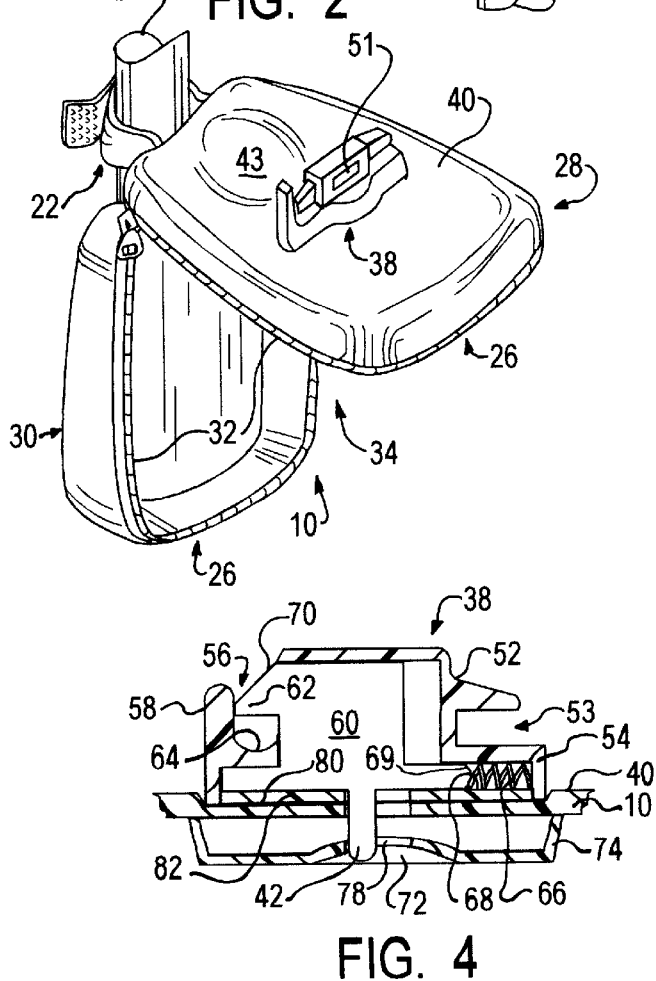
FIG. 3
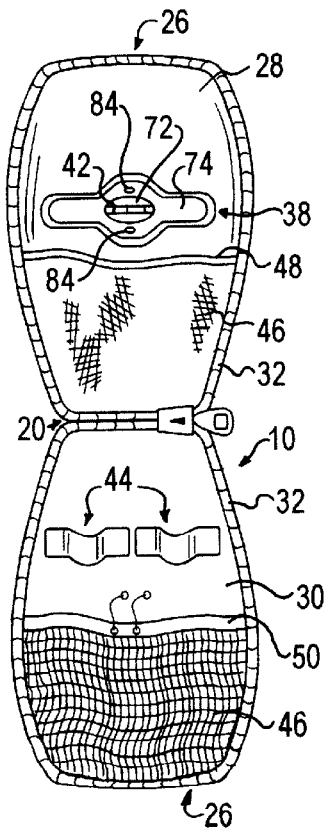
FIG. 4

BICYCLE SEAT PACK

BACKGROUND OF THE INVENTION

The present invention relates to a storage pack which is suspended from a bicycle seat. More particularly, the pack is made of a firm semirigid molded material, includes structure for releasably locking the pack to rails of the seat and, because of enhanced interior accessibility, if desired, may be compartmentalized.

PRIOR ART

Heretofore various bicycle seat packs have been proposed for use in carrying such items such as an inner tube, tire pressure gauge, etc. Such packs are usually soft sided and include a stiffener which gives form and substance to and reinforces upper and lower surfaces of the pack. A zipper extends a little over halfway around a rearwardly facing end of the pack and the interior may or may not include compartment forming structure.

Engagement structure typically includes two upwardly extending brackets, each of which is an inverted L in shape, with free ends pointing away from each other, or pointing in the same direction. Those pointing in the same direction usually drop over or snap onto substantially parallel rails under the bike seat while those pointing away from one another usually require parallel elevation above and between the rails and then a twisting motion to bring the brackets over and into engagement with the seat rails. Further, such seat packs also include structure at a forwardly directed end thereof by means of which the pack engages a seat post ahead of it to stabilize front to rear orientation of the pack.

Presently available seat packs thus cannot be locked onto the rails and, due to less than optimal zipper length and placement, access to the interior of the pack is restricted and difficult. Further, due to the softness of the pack material, a reinforcing layer or structure is required, increasing labor and material expenses for pack production.

SUMMARY OF THE INVENTION

Accordingly it is a primary object of the invention to provide a bicycle seat pack made of a semirigid material which requires no further reinforcement, which includes a much longer circumferential zipper, allowing for compartmentalization of the pack's interior space as well as providing ease in access, and which includes a seat rail engaging assembly which releasably locks the pack onto the seat rails until the lock is released from the interior of the pack.

BRIEF DESCRIPTION OF THE DRAWINGS

FIG. 1 is a rear perspective view of a bicycle seat and a seat pack made in accordance with the teachings of the present invention, the pack having a top portion broken away to show an interior releasable lever of a releasably locking seat rail engaging assembly of the pack.

FIG. 2 is a perspective view of the pack in an open position thereof showing a forward end of the pack engaged to a seat post of a bicycle.

FIG. 3 is an interior plan view of the seat pack showing one possible compartmentalization scheme for the interior of the seat packs.

FIG. 4 is a cross sectional view through the releasably locking seat rail engaging assembly of the pack.

DESCRIPTION OF THE PREFERRED EMBODIMENT

Referring now to the drawings in greater detail, there is illustrated therein a bicycle seat pack made in accordance with the teachings of the present invention and generally identified by the reference numeral 10.

As shown, the pack 10 is designed to depend below a rear section 12 of a bicycle seat 14 from a pair of substantially horizontal and parallel seat rails 16 located along an underside 18 of the seat 14.

The pack 10 has an essentially clam shell configuration, having a forward hinged end 20 which includes structure 22 for engaging a bicycle seat post 24 to stabilize front to rear orientation of the pack 10. The structure 22 may take various forms and a strap form 22 is illustrated here.

A rear end 26 of the pack 10 is designed to be separable into two sections 28 and 30 by a circumferential zipper 32 which extends almost completely around the pack 10, except for the area where the seat post engaging structure 22 is situated. Such relatively lengthened zipper 32 provides for the sections 28 and 30 of the pack 10 to separate to a greater angle, allowing for easy access to an interior space 34 defined by and within the pack 10.

The pack section 28 may be defined as an upper or top section 28 and includes a releasably locking seat rail engaging assembly 38 on an upwardly disposed surface 40 thereof. The rail engaging assembly 38 is releasable by activation of a release lever 42 depending into the interior space 34, as will be further described in connection with the description of FIGS. 3 and 4.

The top section 28 includes an oval concavity 43 within which seat 14 mounting structures may depend without interfering with mounting of the pack 10 to the seat rails 16.

The pack section 30 may be defined as a lower or bottom, drop section 30 which, when the sections 28 and 30 are unzipped from each other, drops into a near vertical orientation, at a position just behind the seat post 24.

By configuring the zipper 32 to extend nearly completely around the pack 10, producing a dropping away capability for the bottom section 30, accessibility into the interior space 34 is significantly enhanced. Such enhanced accessibility allows for compartmentalization of the interior space 34, one embodiment of a compartmentalization scheme being shown in FIG. 3. It will be understood, of course, that the interior space 34 need not be compartmentalized, with a plain interior space 34 being illustrated in FIG. 2.

As shown in FIG. 3, hanger loops 44, such as for engaging a tire pressure gauge (not shown) can be created within the interior space 34 in known manner. Further, if desired, one or more pouches 46, made of fabric or mesh, may also be provided, with either an elasticized entry band 48 or with a drawstring type closure 50.

Still further, because of ease of accessibility into the interior space 34, the release lever 42 of the seat rail engaging assembly 38 may be provided therewithin and easily manipulated for releasing the pack 10 from the seat rails 16. Alternatively, the release lever 42 may be positioned to extend through a side slot 51 in a housing 52 of the assembly 38.

As best illustrated in FIG. 4, the seat rail engaging assembly 38 includes the housing 52 which extends upwardly from the top surface 40 of the upper section 28 of the pack 10. The housing 52 includes a horizontal slot 53 at a first end 54 thereof and a vertical slot 56 toward a second end 58 thereof, the vertical slot 56 and the horizontal slot 53 vertically ending in the same plane. Between the slots 53 and 56 and within the housing 52 is a biased horizontal slide member 60 which includes a protuberance 62 which extends across an area of the vertical slot 56 such that the depth of the vertical slot 56 between the protuberance and a bottom wall 64 thereof is equal to a height of the horizontal slot 53. The slide member 60 is biased by a biasing spring 66 which rests horizontally within a spring chamber 68 in the housing 50, the spring chamber 68 underlying the horizontal slot 53 and biases against and between a spring contact point 69 of the slide member 60 and end wall 54 of the housing 50.

The release lever 42 is horizontally manipulated against the action of the spring 66 causing the protuberance 62 to draw back into the housing 50 to release the rail 16 from the vertical slot 56.

It will be seen that the protuberance 62 has a sloped upper surface 70 so that, when mounting the pack 10, the rail 16 to be engaged under the protuberance 62 needs only to exert force against the upper surface 70 to slide past it.

It will further be seen that the release lever 42 for the assembly 38 is seated within a slotted finger recess 72 in an inner pack housing plate 74, the lever 42 extending through a slit 76 in the pack 10 and a slot 78 centered in the finger recess 72.

To assure that a bottom surface 80 of the slide member 60 moves easily back and forth within the housing 52 provided for same, a cap 82 is seated therebeneath and is sandwiched between the slide member 60 and the pack 10.

The housing 52 and the inner pack housing plate 74 are then engaged to one another with fasteners such as screws 84 which pass through and sandwich the pack 10 therebetween.

In use, when the pack 10 is to be mounted, one seat rail 16 is first slid into the horizontal slot 53 and then the other seat rail 16 is aligned with the vertical slot 56 and the pack 10 is pushed upwardly until the second rail 16 pushes past the protuberance 62 against the bottom wall 64 of the slot 56, with the protuberance 62 snapping back into the slot 56 thereover.

To remove the pack 10, the pack 10 must be opened just enough to allow finger access to the release lever 42, the lever 42 being moved across the slit 78 until the rail 16 in the vertical slot 56 clears the protuberance 62 and then the other rail 16 is slid out of the horizontal slot 53.

It will be understood that the seat rail engaging assembly 38 described herein is not limited for use only on the pack 10 but may also be used in attaching other accessories in a similar manner, if desired, to the seat rails 16.

As described above, the seat pack 10 provides a number of advantages, some of which have been described above and others of which are inherent in the invention. Also modifications may be proposed to the pack 10 without departing from the teachings herein. Accordingly the scope of the invention is only to be limited as necessitated by the accompanying claims.

I claim:

1. A releasably locking assembly for engaging an accessory to seat rails located along an undersurface of a bicycle seat, the assembly comprising at least a housing having a first end engaging slot, the second end including vertical seat rail engaging slot, a spring biased slide mechanism mechanically engaged within the housing and including a protuberance thereon which is biased horizontally across said vertical slot at a predefined position above a base thereof, a biasing spring for the slide mechanism engaged within a spring slot in the housing and extending between the first end of the housing and a spring contact point on the slide mechanism, and a release lever for said slide assembly extending through a slot in said housing, said release lever being slideable within said slot to move the slide member protuberance into said housing to open said vertical slot.

2. The assembly of claim 1 wherein said protuberance has a sloped upper surface.

3. The assembly of claim 2 wherein said protuberance extends though a slot in said housing when biased across said vertical slot.

4. The assembly of claim 2 including structure for mechanically engaging an accessory in a depending manner.

* * * * *